United States Patent [19]

Berclaz et al.

[11] 4,125,239
[45] Nov. 14, 1978

[54] PEDAL MECHANISM

[76] Inventors: Rene-Louis Berclaz, 24 rue de la Croix-Blanche, 1066 Epalinges; Robert Fontannaz, route des Mouthes, 1343 Les Charbonnieres, both of Switzerland

[21] Appl. No.: 810,780

[22] Filed: Jun. 28, 1977

[30] Foreign Application Priority Data

Jun. 28, 1976 [CH] Switzerland ............... 8328/76

[51] Int. Cl.² ............................................. B62M 1/02
[52] U.S. Cl. ....................................... 248/69; 280/260
[58] Field of Search ............... 74/47, 48, 40, 49, 50, 74/45, 46, 69, 65, 66, 67, 68; 280/260, 261, 262

[56] References Cited

U.S. PATENT DOCUMENTS

| 490,134 | 1/1893 | Brigat | 74/69 |
| 546,954 | 9/1895 | Decker | 74/69 X |
| 616,122 | 2/1898 | Lester | 74/66 X |
| 636,658 | 11/1899 | Grace | 74/40 |
| 3,047,310 | 7/1962 | DeBaun | 74/69 X |

FOREIGN PATENT DOCUMENTS

| 996,059 | 12/1951 | France | 74/69 |
| 339,106 | 4/1936 | Italy | 74/40 |
| 427,454 | 11/1947 | Italy | 280/260 |
| 460,294 | 11/1950 | Italy | 74/69 |

Primary Examiner—J. Franklin Foss
Attorney, Agent, or Firm—Robert E. Burns; Emmanuel J. Lobato; Bruce L. Adams

[57] ABSTRACT

A pedal mechanism for a bicycle having a pedal crank formed of two telescopic elements, one of which is fixed the other being controlled by an assembly designed to impart thereto a reciprocating radial movement so that the length of the crank during rotation varies between predetermined minimum and maximum values. This arrangement increases the operating efficiency of the bicycle.

3 Claims, 6 Drawing Figures

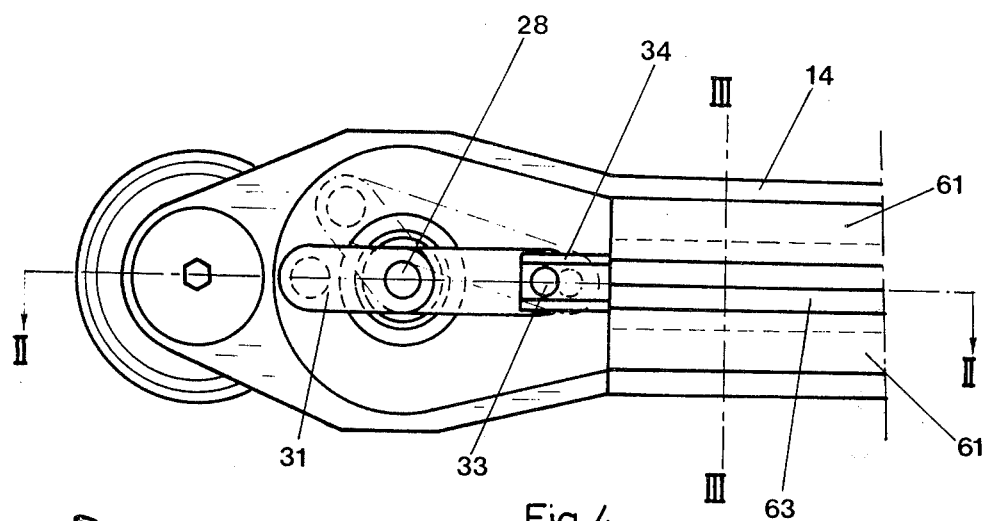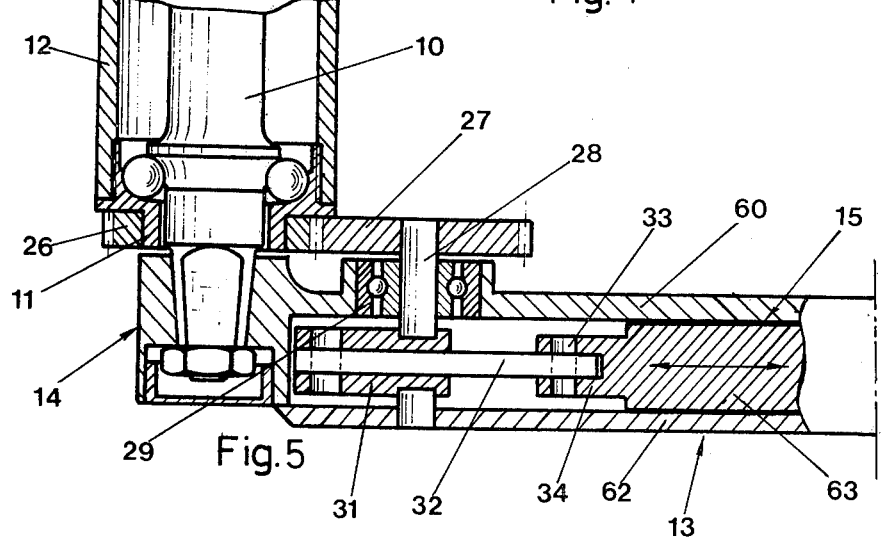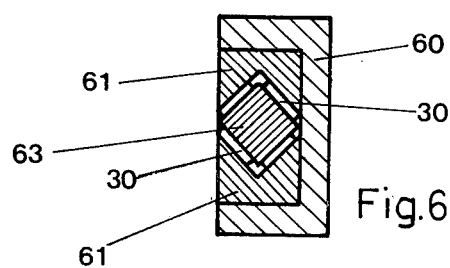

PEDAL MECHANISM

The present invention relates to a pedal mechanism particularly for bicycles.

According to the invention there is provided a pedal mechanism having a crank formed of two telescopic elements one of which is arranged for controlled movement by an assembly having a fixed toothed element disposed coaxial with the pedal mechanism arranged for meshing engagement with a planetary gear mounted on said first telescopic element, and means adapted to transform rotational movement of the planetary gear into reciprocating radial movement of said second telescopic element so that the length of the crank varies between predetermined maximum and minimum values during consecutive rotations thereof.

The invention will now be described by way of example with reference to the accompanying drawings, in which:

FIG. 4 illustrates a second embodiment of a pedal mechanism; and

FIGS. 5 and 6 are cross-sectional views taken on lines V—V and VI—VI, respectively, of FIG. 4.

Figure 1:
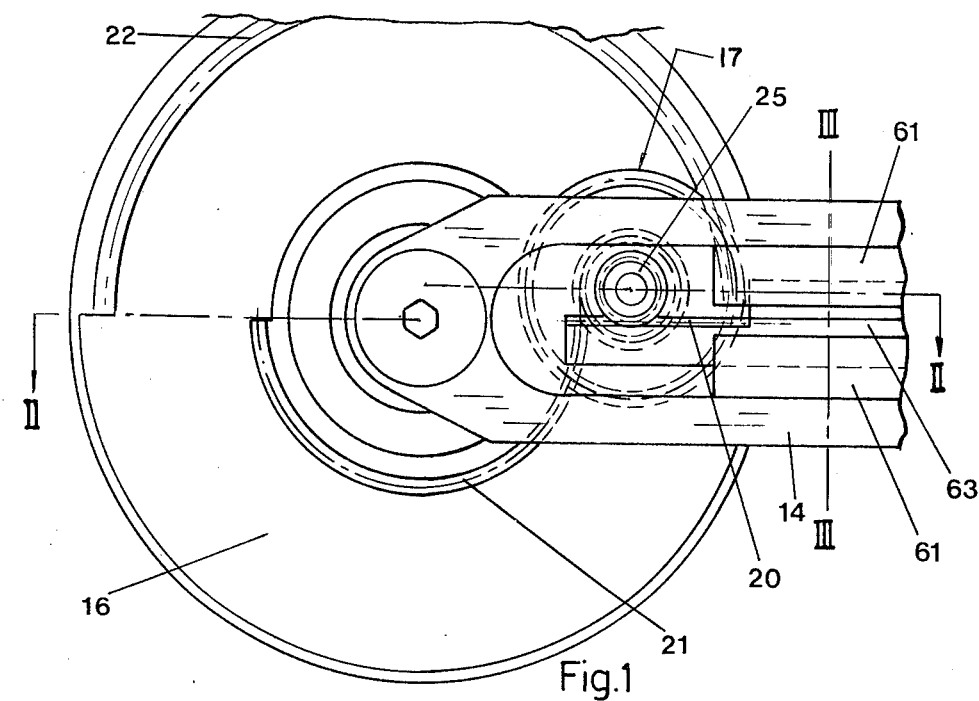
FIG. 1 is an elevational view of the first embodiment of a pedal mechanism an element being removed to show the inner parts of the mechanism.
Figure 2:
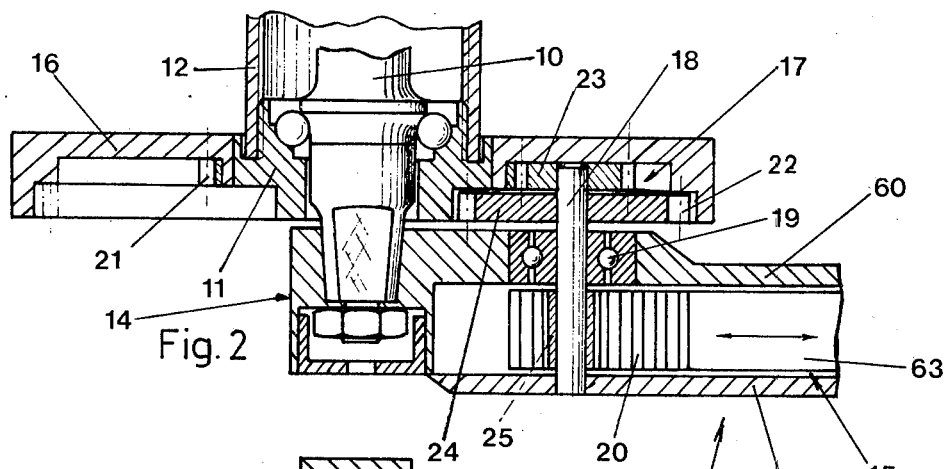
FIGS. 2 and 3 are cross-sectional views taken on the lines II—II and III—III, respectively, of FIG. 1.
Figure 3:
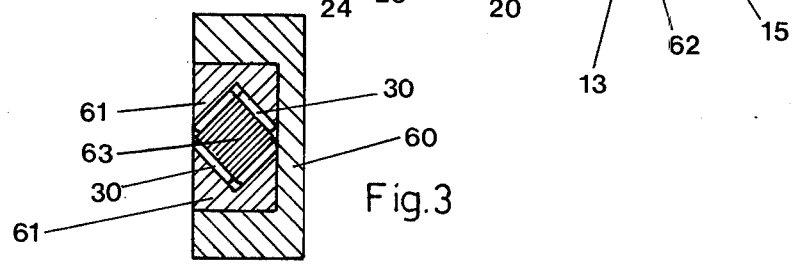

The pedal mechanism shown in FIGS. 1 to 3 comprises a shaft 10 mounted for rotation in a case 11 forced into a tube 12 of the frame of a cycle, a crank 13 comprising two telescopic elements 14 and 15, the first element 14 being fixed to the shaft 10 and the second element 15 being mounted in the first element 14 with the interposition of needle bearings 30.

The first element 14 comprises a hollow member 60 which is closed by a lid 62, (removed in FIG. 1) locating two elements 61 each having a V-shaped groove which are arranged facing one another and define an outer rolling path for the needles 30.

The second element 15, comprising a rod 63 which is square in cross-section the four faces thereof forming an inner rolling path of the needles 30, is controlled by a mechanism which gives it a reciprocating radial movement during rotation of the crank.

This mechanism comprises a rim 16 fixed to the outside of the case 11, a movable planetary gear 17 having a shaft 18 which rotates, with the interposition of a ball bearing 19, in the element 14, and a rack 20 formed at the end of the rod 63.

The rim 16 has an inner toothed sector 21 and an outer toothed sector 22 which extend along complimentary arcs of 180°.

The movable gear 17 comprises two gears 23 and 24 respectively and alternatingly meshing with the sectors 21 and 22, and a pinion 25 in permanent meshing engagement with the rack 20.

The number of teeth and the modulus of the sectors 21, 22 and the gears 23, 24 are determined so that the element 15 of the crank 13 effects a reciprocating radial movement for each rotation of the pedal mechanism.

In these conditions, the length of the crank varies periodically during each rotation between a minimum and a maximum value depending on the symmetrical angular positions of the crank chosen as a function of the variable intensity of the force applied to each pedal by the cyclist so as to obtain maximum efficiency of the cycle.

The embodiment shown in FIGS. 4 to 6 differs from the first one in so far as the mechanism designed to impart a reciprocating radial movement to the element 15 of the crank 13 is concerned.

This mechanism of FIGS. 4 to 6 comprises a ring gear 26 fixed to the outside of the case 11, a planetary pinion 27 mounted with the interposition of a ball bearing 29 on the element 14 and meashing with the ring gear 26, a crankshaft 31 fixed to the shaft of the pinion 27 inside the element 60, and a connecting rod 32 having one end connected to the crankshaft 31 and the other to a pin 33 located in an extension of the rod 63.

The pinions 26 and 27 have the same number of teeth so that the crankshaft 31 effects a 360° rotation per each revolution of the pedal, and the element 15 of the crank a reciprocating radial movement.

In the same conditions as those of the first embodiment the length of the crank varies periodically during each rotation between a maximum and a minimum value.

We claim:

1. A pedal mechanism for a bicycle comprising a pedal crank formed of two telescopic elements, a planetary gear mounted on said first telescopic element, a toothed element mounted coaxially of said mechanism for meshing engagement with said planetary gear, and means for transforming rotational movement of said planetary gear into reciprocating radial movement of said second telescopic element so that the length of said crank varies between predetermined maximum and minimum values during rotation thereof.

2. A pedal mechanism as claimed in claim 1, wherein said toothed element comprises a fixed rim having an inner toothed sector and an outer toothed sector which extend along two complementary arcs, the movable planetary gear including two toothed wheels respectively alternatingly meshing with said two toothed sectors, and a pinion meshing with a rack integral with said second telescopic element.

3. A pedal mechanism as claimed in claim 1, wherein said toothed element comprises a fixed ring gear in meshing engagement with the planetary gear, a crankshaft being fixed to the shaft of said planetary gear, and a connecting rod having one end connected to the crankshaft and the other end connected to the second telescopic element.

* * * * *